US010853943B2

United States Patent
Laradji et al.

(10) Patent No.: US 10,853,943 B2
(45) Date of Patent: Dec. 1, 2020

(54) COUNTING OBJECTS IN IMAGES BASED ON APPROXIMATE LOCATIONS

(71) Applicant: Element AI Inc., Montreal (CA)

(72) Inventors: Issam Hadj Laradji, Montreal (CA); Negar Rostamzadeh, Montreal (CA); Pedro Henrique Oliveira Pinheiro, Montreal (CA); David Maria Vazquez Bermudez, Montreal (CA); Mark William Schmidt, Vancouver (CA)

(73) Assignee: ELEMENT AI INC., Montreal (CA)

( * ) Notice: Subject to any disclaimer, the term of this patent is extended or adjusted under 35 U.S.C. 154(b) by 192 days.

(21) Appl. No.: 16/050,101

(22) Filed: Jul. 31, 2018

(65) Prior Publication Data

US 2020/0043171 A1   Feb. 6, 2020

(51) Int. Cl.
| | |
|---|---|
| *G06K 9/00* | (2006.01) |
| *G06T 7/11* | (2017.01) |
| *G06K 9/62* | (2006.01) |
| *G06T 7/12* | (2017.01) |

(52) U.S. Cl.
CPC ............... *G06T 7/11* (2017.01); *G06K 9/627* (2013.01); *G06K 9/6257* (2013.01); *G06T 7/12* (2017.01); *G06T 2207/20081* (2013.01); *G06T 2207/20084* (2013.01); *G06T 2207/20152* (2013.01); *G06T 2207/30204* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 2010/0002920 A1* | 1/2010 | Cosatto | G06K 9/00147 382/128 |
| 2016/0259963 A1* | 9/2016 | Cohen | G06K 9/6256 |

OTHER PUBLICATIONS

Li, Yuhong, Xiaofan Zhang, and Deming Chen. "CSRNet: Dilated convolutional neural networks for understanding the highly congested scenes" Proceedings of the IEEE Conference on Computer Vision and Pattern Recognition. 2018.

(Continued)

*Primary Examiner* — Soo Jin Park

(74) *Attorney, Agent, or Firm* — Fasken Martineau DuMoulin

(57) ABSTRACT

Systems and methods for counting objects in images based on each object's approximate location in the images. An image is passed to a segmentation module. The segmentation module segments the image into at least one object blob. Each object blob is an indication of a single object. The object blobs are counted by a counting module. In some embodiments, the segmentation module segments the image by classifying each image pixel and grouping nearby pixels of the same class together. In some embodiments, the segmentation module comprises a neural network that is trained to group pixels based on a set of training images. A plurality of the training images contain at least one point marker corresponding to a single training object. The segmentation module learns to group pixels into training object blobs that each contain a single point marker. Each training object blob is thus an indication of a single object.

12 Claims, 7 Drawing Sheets

(56) References Cited

OTHER PUBLICATIONS

Kumagai, Shohei, Kazuhiro Hotta, and Takio Kurita. "Mixture of Counting CNNs: Adaptive Integration of CNNs Specialized to Specific Appearance for Crowd Counting." arXiv preprint arXiv:1703.09393 (2017).
Walach, Elad, and Lior Wolf. "Learning to count with CNN boosting." European Conference on Computer Vision. Springer, Cham, 2016.
Sindagi, Vishwanath A., and Vishal M. Patel. "Generating high-quality crowd density maps using contextual pyramid cnns." 2017 IEEE International Conference on Computer Vision (ICCV). IEEE, 2017.
Arjovsy, Martin, Soumith Chintala, and Léon Bottou. "Wasserstein generative adversarial networks." International Conference on Machine Learning. 2017.
Arteta, Carlos, Victor Lempitsky, and Andrew Zisserman. "Counting in the wild." European conference on computer vision. Springer, Cham, 2016.
Bearman, Amy, et al. "What's the point: Semantic segmentation with point supervision." European Conference on Computer Vision. Springer, Cham, 2016.
Blumensath, Thomas, and Mike E. Davies. "Iterative hard thresholding for compressed sensing." Applied and computational harmonic analysis 27.3 (2009): 265-274.
Chattopadhyay, Prithvijit, et al. "Counting Everyday Objects in Everyday Scenes." CVPR. 2017.
Onoro-Rubio, Daniel, and Roberto J. López-Sastre. "Towards perspective-free object counting with deep learning." European Conference on Computer Vision. Springer, Cham, 2016.
Guerrero-Gomez-Olmedo, Ricardo, et al. "Extremely overlapping vehicle counting." Iberian Conference on Pattern Recognition and Image Analysis. Springer, Cham, 2015.
Kingma, Diederik P., and Jimmy Ba. "Adam: A method for stochastic optimization." arXiv preprint arXiv:1412.6980 (2014).
Oquab, Maxime, et al. "Is object localization for free?-weakly-supervised learning with convolutional neural networks." Proceedings of the IEEE Conference on Computer Vision and Pattern Recognition. 2015.
De Almeida, Paulo RL, et al. "PKLot—A robust dataset for parking lot classification." Expert Systems with Applications 42.11 (2015): 4937-4949.
Shelhamer, Evan, Jonathan Long, and Trevor Darrell. "Fully convolutional networks for semantic segmentation." arXiv preprint arXiv:1605.06211 (2016).
Wu, Kesheng, et al. "Optimizing connected component labeling algorithms." Medical Imaging 2005: Image Processing. vol. 5747. International Society for Optics and Photonics, 2005.
Charles, Richard M., et al. "Nonnegative Matrix Factorization applied to reordered pixels of single images based on patches to achieve structured nonnegative dictionaries." arXiv preprint arXiv:1506.08110 (2015).
Chen, Tianqi, et al. "Net2net: Accelerating learning via knowledge transfer." arXiv preprint arXiv:1511.05641 (2015).
Chen, Liang-Chieh, et al. "Semantic image segmentation with deep convolutional nets and fully connected crfs." arXiv preprint arXiv:1412.7062 (2014).
Cohen, Joseph Paul, et al. "Count-ception: Counting by fully convolutional redundant counting." Computer Vision Workshop (ICCVW), 2017 IEEE International Conference on. IEEE, 2017.
Everingham, Mark, and John Winn. "The pascal visual object classes challenge 2012 (voc2012) development kit." Pattern Analysis, Statistical Modelling and Computational Learning, Tech. Rep (2011).
He, Kaiming, et al. "Spatial pyramid pooling in deep convolutional networks for visual recognition." European conference on computer vision. Springer, Cham, 2014.

Jegou, Simon, et al. "The one hundred layers tiramisu: Fully convolutional densenets for semantic segmentation." Computer Vision and Pattern Recognition Workshops (CVPRW), 2017 IEEE Conference on. IEEE, 2017.
Koch, Gregory, Richard Zemel, and Ruslan Salakhutdinov. "Siamese neural networks for one-shot image recognition." ICML Deep Learning Workshop. vol. 2. 2015.
Lempitsky, Victor, and Andrew Zisserman. "Learning to count objects in images." Advances in neural information processing systems. 2010.
Liu, Wei, et al. "Ssd: Single shot multibox detector." European conference on computer vision. Springer, Cham, 2016.
Long, Jonathan, Evan Shelhamer, and Trevor Darrell. "Fully convolutional networks for semantic segmentation." Proceedings of the IEEE conference on computer vision and pattern recognition. 2015.
Loy, Chen Change, et al. "Crowd counting and profiling: Methodology and evaluation." Modeling, Simulation and Visual Analysis of Crowds. Springer, New York, NY, 2013. 347-382.
Rabaud, Vincent, and Serge Belongie. "Counting crowded moving objects." Computer Vision and Pattern Recognition, 2006 IEEE Computer Society Conference on. vol. 1. IEEE, 2006.
Redmon, Joseph, et al. "You only look once: Unified, real-time object detection." Proceedings of the IEEE conference on computer vision and pattern recognition. 2016.
Ren, Shaoqing, et al. "Faster r-cnn: Towards real-time object detection with region proposal networks." Advances in neural information processing systems. 2015.
Simonyan, Karen, and Andrew Zisserman. "Very deep convolutional networks for large-scale image recognition." arXiv preprint arXiv:1409.1556 (2014).
Tu, Peter, et al. "Unified crowd segmentation." European conference on computer vision. Springer, Berlin, Heidelberg, 2008.
Wang, Meng, and Xiaogang Wang. "Automatic adaptation of a generic pedestrian detector to a specific traffic scene." Computer Vision and Pattern Recognition (CVPR), 2011 IEEE Conference on. IEEE, 2011.
Wang, Xiaogang, and Xiaoxu Ma. "Unsupervised activity perception in crowded and complicated scenes using hierarchical bayesian models." (2008).
Zhang, Yingying, et al. "Single-image crowd counting via multi-column convolutional neural network." Proceedings of the IEEE conference on computer vision and pattern recognition. 2016.
Zhao, Hengshuang, et al. "Pyramid scene parsing network." IEEE Conf. on Computer Vision and Pattern Recognition (CVPR). 2017.
Zen, Gloria, et al. "Enhanced semantic descriptors for functional scene categorization." Pattern Recognition (ICPR), 2012 21st International Conference on. IEEE, 2012.
Bai, Min, and Raquel Urtasun. "Deep watershed transform for instance segmentation." 2017 IEEE Conference on Computer Vision and Pattern Recognition (CVPR). IEEE, 2017.
Chen, Ke, et al. "Feature mining for localised crowd counting." BMVC. vol. 1. No. 2. 2012.
Chan, Antoni B., Zhang-Sheng John Liang, and Nuno Vasconcelos. "Privacy preserving crowd monitoring: Counting people without people models or tracking." Computer Vision and Pattern Recognition, 2008. CVPR 2008. IEEE conference on. IEEE, 2008.
Shi, Jianbo, and Carlo Tomasi. Good features to track. Cornell University, 1993.
Girshick, R. Fast R-CNN. In ICCV, 2015.
Arteta, Carlos, et al. "Learning to detect cells using non-overlapping extremal regions." International Conference on Medical Image Computing and Computer-Assisted Intervention. Springer, Berlin, Heidelberg, 2012.
Arteta, Carlos, et al. "Learning to detect partially overlapping instances." Proceedings of the IEEE Conference on Computer Vision and Pattern Recognition. 2013.
Arteta, Carlos, et al. "Detecting overlapping instances in microscopy images using extremal region trees." Medical image analysis 27 (2016): 3-16.
Ronneberger, Olaf, Philipp Fischer, and Thomas Brox. "U-net: Convolutional networks for biomedical image segmentation." International Conference on Medical image computing and computer-assisted intervention. Springer, Cham, 2015.

(56) References Cited

OTHER PUBLICATIONS

Beucher, Serge, and Fernand Meyer. "The morphological approach to segmentation: the watershed transformation." Optical Engineering—New York—Marcel Dekker Incorporated—34 (1992): 433-433.
Nutini, Julie, Issam Laradji, and Mark Schmidt. "Let's Make Block Coordinate Descent Go Fast: Faster Greedy Rules, Message-Passing, Active-Set Complexity, and Superlinear Convergence." arXiv preprint arXiv:1712.08859 (2017).
Nutini, Julie, et al. "Convergence rates for greedy Kaczmarz algorithms, and faster randomized Kaczmarz rules using the orthogonality graph." arXiv preprint arXiv:1612.07838 (2016).
Deng, Jia, et al. "Imagenet: A large-scale hierarchical image database." Computer Vision and Pattern Recognition, 2009. CVPR 2009. IEEE Conference on. Ieee, 2009.
Sindagi, Vishwanath A., and Vishal M. Patel. "A survey of recent advances in cnn-based single image crowd counting and density estimation." Pattern Recognition Letters 107 (2018): 3-16.
Zhang, Shanghang, et al. "Understanding traffic density from large-scale web camera data." arXiv preprint arXiv:1703.05868 (2017).
Zhang, Shanghang, et al. "Fcn-rlstm: Deep spatio-temporal neural networks for vehicle counting in city cameras." Computer Vision (ICCV), 2017 IEEE International Conference on. IEEE, 2017.

\* cited by examiner

COUNTING OBJECTS IN IMAGES BASED ON APPROXIMATE LOCATIONS

TECHNICAL FIELD

The present invention relates to counting objects in an image. More specifically, the present invention relates to counting objects in an image based on approximate locations of those objects within the image.

BACKGROUND

Counting objects in images is an important task in computer vision with many applications, including in surveillance systems, traffic monitoring, ecological surveys, and medical imaging, among others. For example, in traffic monitoring applications, counting methods can be used to track the number of moving cars and of pedestrians, as well as of parked cars. As another example, in ecological applications, such methods can be used to monitor counts of various species, thus providing useful information for wildlife conservation. Certain counting methods can even be useful in challenging datasets in which the images contain many different types of object.

However, many challenges are associated with object counting. Counting methods are required to account for a high degree of variability in objects, in terms of shape, size, pose, and appearance. Moreover, objects may appear at different angles and resolutions, and may be partially occluded (that is, hidden from view due to other objects). Further, background detail, weather conditions, and illumination level can vary widely between images.

Various methods for object counting have been developed as interest in the problem has increased. In general, these methods can be grouped into three categories: counting by clustering; counting by regression; and counting by detection. However, typical methods have several drawbacks. Some cannot work with certain data types, while others require extremely detailed labeling of the input data. Several typical methods, in fact, require per-pixel annotation (that is, they require manual labeling of every pixel outlining a desired object, or even of every pixel comprising that object) which can be highly costly.

Early work in object counting typically focused on methods of counting objects by clustering. These are unsupervised (fully automatic) approaches in which objects are 'clustered' together based on similar features, such as appearance and/or motion cues. However, these methods use basic features of the objects and often perform poorly compared to more recent methods. Additionally, most clustering-based counting methods only work for video sequences, rather than still images.

The second category, methods for 'object counting by regression', is generally considered state-of-the-art. Some such methods use object density maps to obtain counts. These methods perform well for standardized problems but cannot handle images in which the objects vary substantially in size, shape, orientation, etc. Other regression-based methods, including a method known as 'Glance', directly rely on object features (see Chattopadhyay et al, "Counting Everyday Objects in Everyday Scenes", CVPR 2017, the entirety of which is herein incorporated by reference). Glance and similar methods require only relatively cheap "image-level annotation" on the input images. (For example, an image-level annotation might be "somewhere in this image there is a cow".) However, Glance is inefficient with images containing large numbers of objects. As a result, other regression-based methods, including a method called 'subitizing', have been developed to handle large numbers of objects. However, subitizing still has drawbacks: this method requires a complicated training procedure, and requires expensive and detailed per-pixel annotation.

In the third category, methods of 'object counting by detection' simply detect each object of interest in an image and count the number of objects detected. Perfect object detection would thus imply a perfect count. However, even state-of-the-art typical object detection methods are not optimal for object counting. First, such methods require either per-pixel annotation or bounding boxes to identify objects, both of which are expensive. Further, typical detection methods do not deal well with objects that are heavily occluded, as they are required to identify the shape and size of all objects, as well as the objects' locations within the image.

As a result, there is a need for methods for object counting that overcome the drawbacks of the prior art. Preferably, such methods would not require substantially annotated input images and would be able to adjust to wide object variation between images.

SUMMARY

The present invention provides systems and methods for counting objects in images based on each object's approximate locations in the images. An image is passed to a segmentation module. The segmentation module segments the image into at least one object blob. Each object blob is an indication of a single object. The object blobs are counted by a counting module. In some embodiments, the segmentation module segments the image by classifying each image pixel and grouping nearby pixels of the same class together. In some embodiments, the segmentation module comprises a neural network that is trained to group pixels based on a set of training images. A plurality of the training images contain at least one point marker corresponding to a single training object. The segmentation module learns to group pixels into training object blobs that each contain a single point marker. Each training object blob is thus an indication of a single object.

In a first aspect, the present invention provides a method for counting objects in an image, said method comprising the steps of:
(a) receiving said image;
(b) segmenting said image into at least one object blob, each object blob being an indication of a single object; and
(c) counting said at least one object blob, to thereby result in a count of said number of objects.

In a second aspect, the present invention provides a system for counting objects in an image, said system comprising:
  a segmentation module for:
    receiving said image; and
    segmenting said image into at least one object blob, each object blob being an indication of a single object; and
  a counting module for counting said at least one object blob, to thereby result in a count of said number of objects.

In a third aspect, the present invention provides non-transitory computer-readable media having encoded thereon computer-readable and computer-executable instructions that, when executed, implement a method for counting objects in an image, said method comprising the steps of:
(a) receiving said image;

(b) segmenting said image into at least one object blob, each object blob being an indication of a single object; and
(c) counting said at least one object blob to thereby result in a count of said number of objects.

BRIEF DESCRIPTION OF THE DRAWINGS

The present invention will now be described by reference to the following figures, in which identical reference numerals refer to identical elements and in which.

DETAILED DESCRIPTION

The present invention provides systems and methods for counting objects in images. The present invention can achieve results that equal or better the state-of-the-art in object counting, using input images that do not need expensive per-pixel annotation or bounding boxes. Rather, the input images for the present invention merely require "point-level annotation", which will be described in more detail below. Additionally, some embodiments of the present invention use neural networks. These embodiments only require point-level annotation on images used to train the neural networks. The input images in such embodiments need no annotation or labeling.

Methods using point-level annotation allow the present invention to count objects based simply on each object's location within an image, rather than the more expensive shape, size, and location required by counting by detection methods. Additionally, methods using point-level annotation allow the present invention to account for even heavily occluded objects; that is, point-level annotation allows objects that may overlap each other in the image to be separated.

Point-level annotation, also referred to as "point supervision" or similar, is a known technique in the art of image annotation. (See, in particular, Bearman et al, "What's the Point: Semantic Segmentation with Point Supervision", ECCV 2016, the entirety of which is herein incorporated by reference.) Point-level annotation is both more informative than image-level annotation and cheaper than per-pixel annotation or bounding box application. For point-level annotation, an annotator is asked to "point to" a desired object in the image; that is, to indicate an approximate location of the image containing that object. The approximate location may be indicated by a single pixel or a group of pixels, depending on the implementation. A "point marker" is then associated with that approximate location. An image may contain zero, one, or more point markers, depending on how many objects of interest are in the image and/or on which objects of interest the annotator was asked to label. (That is, an annotator may be asked to only label the 'cows' in an image containing both cows and penguins.) It should also be noted that if an image contains no objects of interest, that image will not contain any point markers. In such a case, the entire image will be classified into a 'background' class, and the count for each object of interest will be zero.

Figure 1:
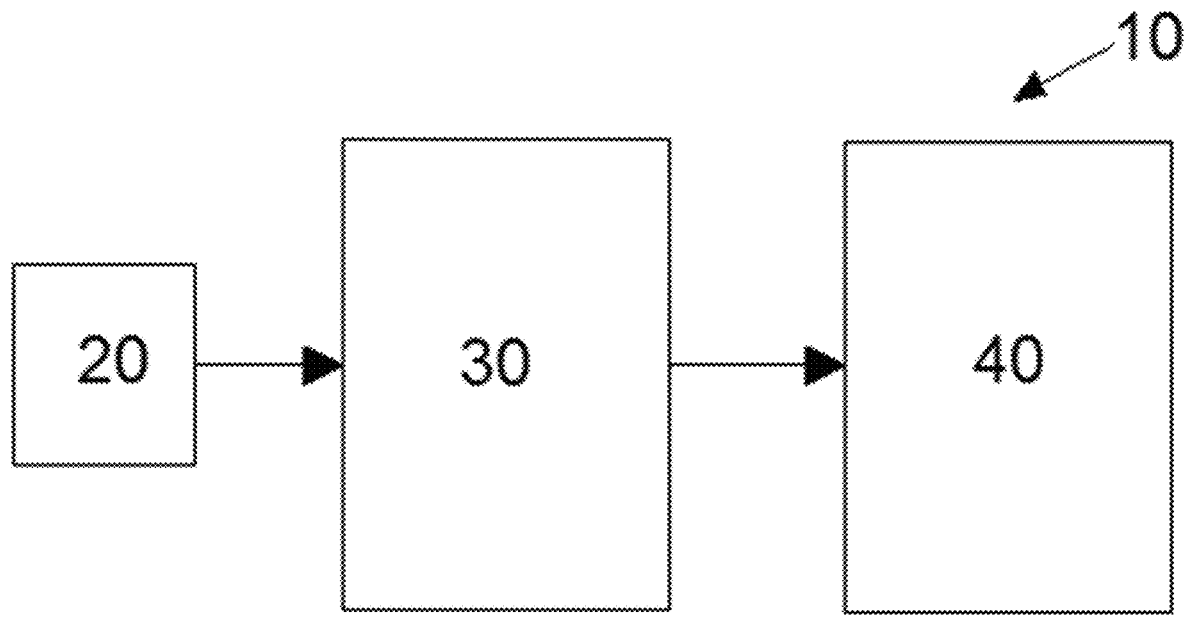
FIG. 1 is a block diagram of a system according to one aspect of the invention.

Referring now to FIG. 1, a block diagram showing a system according to one aspect of the invention is illustrated. The system 10 takes an input image 20 as input to a segmentation module 30. The image 20 contains at least one point marker. The segmentation module 30 then segments the image 20 into at least one object blob. The segmentation is performed so that each resulting object blob contains one and only one point marker. Thus, each object blob is an indicator of a corresponding object. The segmented image is then sent to a counting module 40, which counts the number of object blobs in the segmented image and returns that result to the user.

In some implementations, the segmentation module 30 comprises a rule-based module. In such implementations, as shown in FIG. 2, the segmentation module 30 further comprises a classifying module 31, a grouping module 32, and a refining module 33.

Figure 2:
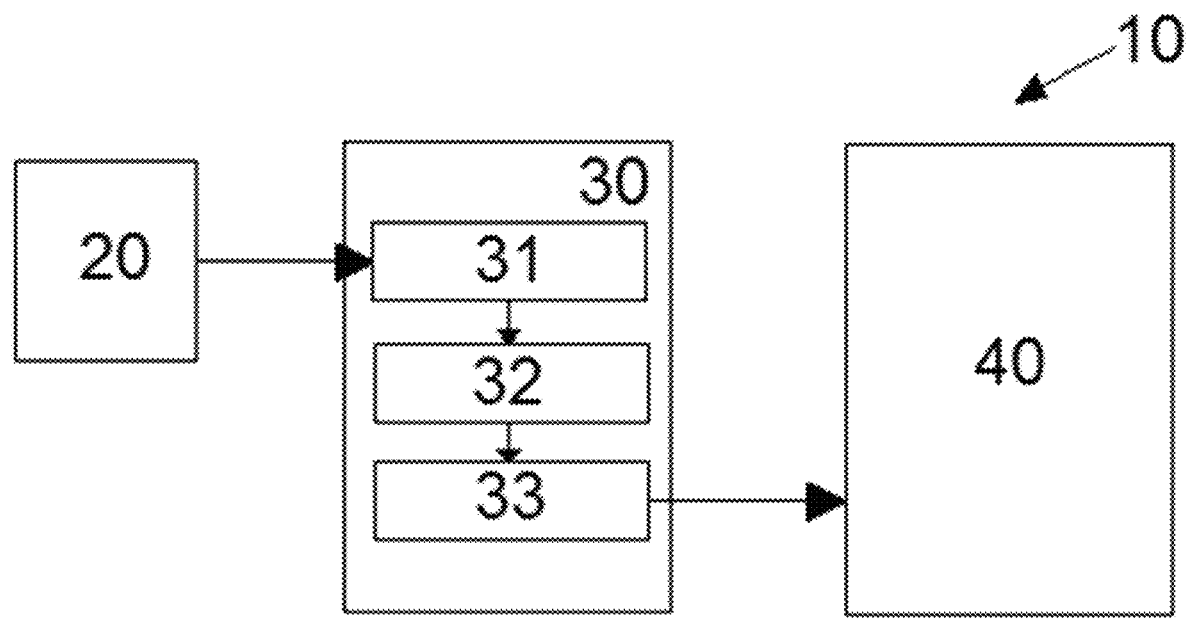
FIG. 2 is a block diagram of another embodiment of the system of FIG. 1.

In FIG. 2, after the input image 20 is received by the segmentation module 30, it is passed to the classifying module 31. The classifying module 31 classifies each pixel of the image 20 into a class based on the type of object depicted by that pixel. For instance, the classifying module 31 would classify one pixel into the class 'cow' if that pixel depicts a part of a cow. Similarly, the classifying module 31 would classify another pixel into the class 'sky/background', if that pixel depicts a part of the sky.

The classified pixel information is then sent to the grouping module 32, which groups nearby pixels of the same class (also called 'similarly classified pixels') together into 'group blobs'. Various grouping methods exist and are known in the art. However, as each object in the image will form a discrete area, the resulting group blobs preferably each cover a contiguous region. That is, each pixel added to a group blob is preferably adjacent to at least one other pixel in the group blob. The grouping module 32 may use such well-known techniques as 'connected component labeling' to perform this grouping. (For more details, see, for instance, Woo, Otoo, and Shoshani, "Optimizing Connected Component Labeling Algorithms", SPIE Medican Imaging Conference 2005.) Each group blob may contain one or more point markers. For instance, if two objects of the same object type overlap in an image, their component pixels would have the same class and be grouped together into a group blob containing two point markers. Additionally, some group blobs may correspond to objects that are not of interest and thus contain no point markers. Such group blobs may correspond to, for instance, 'sky', 'grass', or other 'background', or in some cases, to typically 'foreground' objects for which a count is not desired.

Afterwards, to obtain an accurate object count, the image containing group blobs is passed to a refining module 33.

The refining module 33 separates group blobs that contain more than one point marker into distinct object blobs such that each distinct object blob contains only one point marker. The refining module 33 additionally discards any group blobs that contain no point markers. All the remaining blobs are thus individual object blobs; that is, the only blobs remaining in the image are blobs containing one point marker each, and are therefore indicators of individual objects in the image.

It should be noted that the classifying module 31, the grouping module 32, and the refining module 33 can be separate modules or can be combined with each other. For instance, in certain implementations, a single module may perform the functions of the grouping module 32 and the refining module 33. In other implementations, a single module may perform all three functions of classifying, grouping, and refining. It should be evident that any and all such combinations are included in the scope of the invention.

In still other implementations, the segmentation module 30 comprises a neural network. In a preferred implementation of the present invention, the segmentation module 30 is a fully convolutional neural network (FCN). The use of FCNs for semantic segmentation is well-known in the art (see, for instance, Shelhamer, Long, and Darrell, "Fully Convolutional Networks for Semantic Segmentation", CVPR 2016, the entirety of which is herein incorporated by reference).

In such an implementation, the FCN (or other neural network) is first trained on a set of training images. Each training image comprises training pixels. Additionally, each training image may contain at least one point marker that corresponds to a single training object in the training image. As would be clear to the person skilled in the art, these training objects correspond to desired objects for counting. For instance, if the objects to be counted are penguins, at least some of the training images would contain penguins. Additionally, some of the training images in the set may contain objects other than penguins, and/or contain only background. If a training image only contains background (i.e., if the training image contains no objects to be counted), that training image would contain no point markers, and the neural network would learn not to produce object blobs for such an image. Also, as would be clear to the person skilled in the art, for each different type of object to be counted, a new training process would be required. That is, the neural network would need to be trained to recognize each different type of object.

Each training input image $\mathcal{I}$ may be considered to have a target matrix T that represents the point markers associated with that training image $\mathcal{I}$. T thus has a label c at the location of each object (where c stands for the object class; for instance, 'penguin'), and zero everywhere else. Then, using the well-known softmax function, the FCN classifies each pixel of the image $\mathcal{I}$ by determining a matrix S where each entry $S_{ic}$ is the probability that image pixel i belongs to class c. The FCN then groups pixels of the same class together, to produce a set of group blobs. The set of group blobs is then refined to contain only training object blobs, as also described above.

Through this training process, the FCN will 'learn' to automatically refine group blobs into object blobs (that is, grouping and refining will not require separate steps). Thus, once trained, the FCN can segment an input image 20 into refined object blobs whether or not that input image 20 contains a point marker. Therefore, in implementations of the present invention that use a neural network, only the training images require any annotation. The input images containing objects to be counted require no labeling or annotation.

Additionally, as may be understood, the counting module 40 may comprise conventional rule-based components, neural network components, or combinations thereof. Further, in some implementations, the counting module 40 may be a submodule of the segmentation module 30. Depending on the implementation, the counting module 40 may count all of the object blobs produced by the segmentation module 30. Alternatively, for images containing multiple classes of objects, the counting module 40 may count only object blobs corresponding to one particular predetermined class. This is possible as each object blob contains classified pixels. As another alternative, the counting module 40 may count objects from a predetermined subset of classes.

Loss Function

In one implementation using an FCN, a specific loss function is used to both classify the pixels and to identify object blobs that contain one and only one point marker. This loss function is refined through the FCN's training process. (As would be well-known to the person skilled in the art, a loss function is a mathematical function that indicates a difference between a result of a neural network and a desired result.) This loss function comprises four terms: an image-level loss term; a point-level loss term; a split-level loss term; and a false positive loss term. Each of these terms will be described in more detail below.

The first two terms of the loss function (image-level loss and point-level loss) drive the FCN to classify each pixel into a class based on the type of object depicted by that pixel, as described above. The FCN will then group nearby pixels of the same class into group blobs. (Again, a group blob is formed by grouping pixels of the same class such that each pixel in the final group blob is adjacent to at least one other pixel in the group blob.) However, using these two terms alone cannot account for occluded objects (i.e., group blobs containing more than one point marker) or for objects not currently of interest (i.e., group blobs containing no point markers. The split-level loss term and the false positive loss term are thus added to the loss function to account for such objects.

The loss function can thus be represented mathematically, as follows. Recalling the probability matrix S and the target matrix T for the training image $\mathcal{I}$, the loss function can be written as:

$$\mathcal{L}(S, T) = \underbrace{\mathcal{L}_I(S, T)}_{\text{Image-level loss}} + \underbrace{\mathcal{L}_P(S, T)}_{\text{Point-level loss}} + \underbrace{\mathcal{L}_S(S, T)}_{\text{Split-level loss}} + \underbrace{\mathcal{L}_F(S, T)}_{\text{False positive loss}} \quad (1)$$

Each term will now be described in detail.

Image-Level Loss Term

Let $C_e$ be the set of classes present in the image. For each class $c \in C_e$, the image-level loss $\mathcal{L}_I$ increases the probability that the segmentation module classifies at least one pixel into class c. Additionally, letting $C_{\neg e}$ be the set of classes not present in the image, for each class $c \in C_{\neg e}$, $\mathcal{L}_I$ decreases the probability that the segmentation module classifies any pixel into class c. $C_e$ and $C_{\neg e}$ can be obtained based on the point annotations provided in the input image $\mathcal{I}$. More formally, then, the image-level loss is computed as follows:

$$\mathcal{L}_I(S, T) = -\frac{1}{|C_e|} \sum_{c \in C_e} \log(S_{t_c c}) - \frac{1}{|C_{\neg e}|} \sum_{c \in C_{\neg e}} \log(1 - S_{t_c c}), \quad (2)$$

where $t_c = \text{argmax}_{i \in \mathcal{I}} S_{ic}$. For each class present in the image, at least one pixel should be labeled as that class. Conversely, no pixels should belong to a class that does not exist in the image. Note that it is assumed that each image has at least one background pixel; therefore, $C_e$ is assumed to always contain a background class.

Point-Level Loss

The point-level loss term encourages the segmentation module to correctly label the small set of annotated pixels $\mathcal{I}_s$ contained in the input image. $\mathcal{I}_s$ represents the locations of the objects. The point-level loss term is formally defined as $$\mathcal{L}_P(S, T) = -\sum_{i \in I_s} \log(S_{iT_i}), \qquad (3)$$

where $T_i$ represents the true class label of pixel i. Note also that the point-level loss term ignores all pixels other than the annotated pixels.

Split-Level Loss

The split-level loss term $\mathcal{L}_s$ discourages the segmentation module from predicting object blobs that contain more than one point marker. That is, if a group blob contains n point markers, this loss term directs the segmentation module to split that group blob into n object blobs. Each object blob would thus correspond to a unique object in the image. The splitting may be performed in multiple ways, including but not limited to line splitting and watershed splitting. Both these methods are outlined in more detail below.

Line Splitting

One method of splitting overlapping objects in an image begins by first finding edges between pairs of objects, as it is assumed that an edge will always exist between objects. Therefore, learning to predict edges allows the segmentation module to differentiate between different objects. The segmentation module learns to predict these edges as the background class. This learning process begins by applying a foreground mask $\mathcal{F}$. Let the foreground mask $\mathcal{F}$ be a binary matrix indicating which pixels are predicted by the model as foreground, such that, for each pixel i:

$$F_i = \begin{cases} 0 & \text{if argmax}_j S_{ij} = 0 \\ 1 & \text{otherwise} \end{cases} \qquad (4)$$

The foreground mask $\mathcal{F}$ can then be grouped into a set of group blobs $\mathcal{B}$. The set of group blobs containing more than one point marker can then be represented as a subset of $\mathcal{B}$; that is, as $\bar{\mathcal{B}}$. For each blob b in $\bar{\mathcal{B}}$, the FCN then pairs each point marker $p_1$ in b with the point marker in b that is nearest to $p_i$ (that is, with $p_j$), resulting in a set of pairs $b_p$. For each pair $(p_i, p_j) \in b_p$, the FCN then applies a scoring function to determine the best segment E that is perpendicular to the line between $p_i$ and $p_j$. The segment lines are within the group blob b and intersect its boundaries. The scoring function $z(\cdot)$ for segment E is computed as $$z(E) = \frac{1}{|E|} \sum_{i \in E} S_{i0}, \qquad (4)$$

which is the mean of the foreground probabilities belonging to segment E (where 0 is the background class).

The best edge $E_{best}$ is then defined as the set of pixels representing the perpendicular segment with the highest probability of being background pixels. $E_{best}$ is thus the 'most likely' edge of separation between the two objects. Then, defining $T_b$ as the set of pixels representing best edges generated by the line split method, the split-level loss can be computed as follows:

$$\mathcal{L}_S(S, T) = -\sum_{i \in T_b} \alpha_i \log(S_{ik}), \qquad (5)$$

This loss term encourages splitting group blobs that contain more than one point marker into object blobs that contain only one point marker each and thus represent only one object.

Watershed Splitting

Another way of splitting group blobs may be referred to as "watershed splitting". Watershed splitting may, in some cases, be more informative than line splitting. Watershed splitting may also be more efficient, depending on the implementation.

The watershed splitting process comprises both global (whole-image) and local (small image region) segmentation procedures. For the global segmentation, the well-known watershed segmentation algorithm is applied to the input training image (see Beucher and Meyer, "The morphological approach to segmentation: the watershed transformation", Optical Engineering 34:433, 1993). As is known, this process is based on brightness of pixels in the image upon which the algorithm operates. As is also known, this algorithm takes "seed" values as input. In the present invention, the seeds are taken to be the point markers on the training image. This segmentation is applied on the distance transform of the foreground probabilities, resulting in k segments (where k is the number of point markers in the image).

In the local segmentation procedure, the watershed segmentation is applied only within each blob b in $\bar{\mathcal{B}}$ (that is, within each group blob containing more than one point marker. The point markers within each blob b in $\bar{\mathcal{B}}$ are used as the seeds. This local step encourages the loss function to focus on blobs containing the greatest number of point markers.

The final step of watershed splitting defines $T_b$ as the set of pixels representing the boundaries determined by the global and local segmentation processes. Then, given $T_b$, and taking k=0 to represent the background class, the watershed split is determined as follows:

$$\mathcal{L}_S(S, T) = -\sum_{i \in T_b} \alpha_i \log(S_{ik}), \qquad (6)$$

in which $\alpha_i$ is set as the number of point markers in the blob in which pixel i lies. This encourages the loss function to focus on splitting blobs that have the most point markers.

Splitting Comparison

Figure 3A:
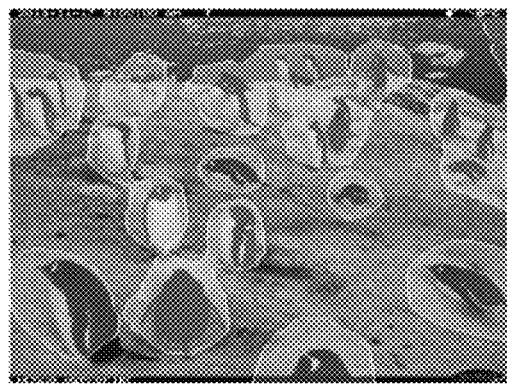
FIG. 3A is an image showing object blobs and group blobs that may be produced at an intermediate stage of the present invention.

Referring now to FIG. 3A, an input image is shown. This image is from the Penguins dataset, which will be described in more detail below. As can be seen, there are multiple penguins in this image, identified by surrounding blobs. Single-penguin blobs contain only one penguin and are shown in green. Multi-penguin blobs contain more than one penguin and are shown in yellow. Red blobs (in the top right corner of the image) represent false positives and contain no penguins.

Figure 3B:
FIG. 3B shows the image of FIG. 3A with a line split refinement applied.
Figure 3C:
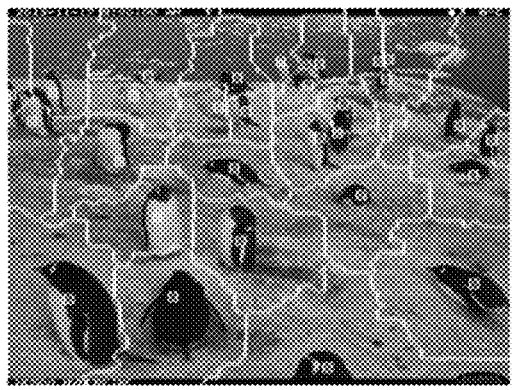
FIG. 3C shows the image of FIG. 3A with a watershed split refinement applied.

FIG. 3B shows the image of FIG. 3A with line splits shown in yellow and yellow boxes on each penguin to represent the point markers. As can be seen, the line splitting method only applies splits between multi-object groups. For instance, the standing penguin in the lower left was identified by a single-penguin blob in FIG. 3A, and is not split from other penguins in FIG. 3B. FIG. 3C, however, shows a watershed split applied to the image of FIG. 3A. As can clearly be seen, the watershed split splits the entire image into k regions, which in some implementations may be desirable.

Table 1, below, shows the performance of the line split process (L) and the watershed split process (W), relative to the well-known "mean average error" (MAE) metric for two validation sets (from the "Trancos" and "Penguins" data sets). This metric and each of these data sets will be described in more detail below. Note that smaller MAE values indicate better performance. Thus, as is evident, the watershed splitting method outperforms the line splitting method in these cases.

TABLE 1

Splitting Process Comparison. Comparison of the line split method (L) and the watershed split method (W) against the validation MAE score for two data sets.

| Split method | Trancos | Penguins |
| --- | --- | --- |
| LC-ResFCN (L) | 4.77 | 1.89 |
| LC-ResFCN (W) | 3.34 | 0.95 |

Figure 3D:
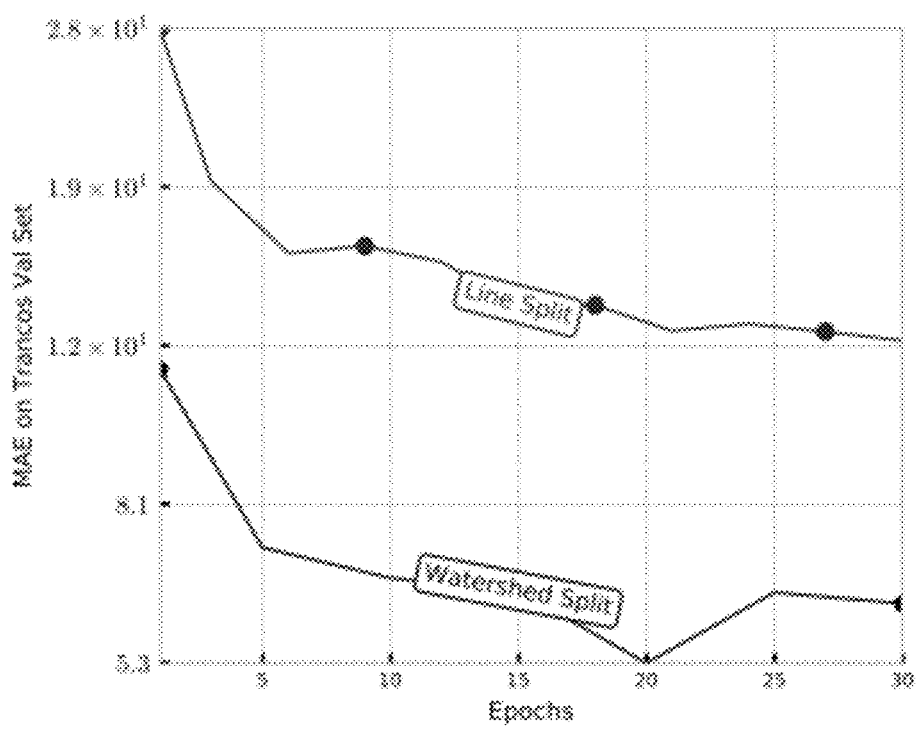
FIG. 3D is a chart showing the relative performance of the line split refinement and the watershed split refinement on the Trancos validation set.
Figure 3E:
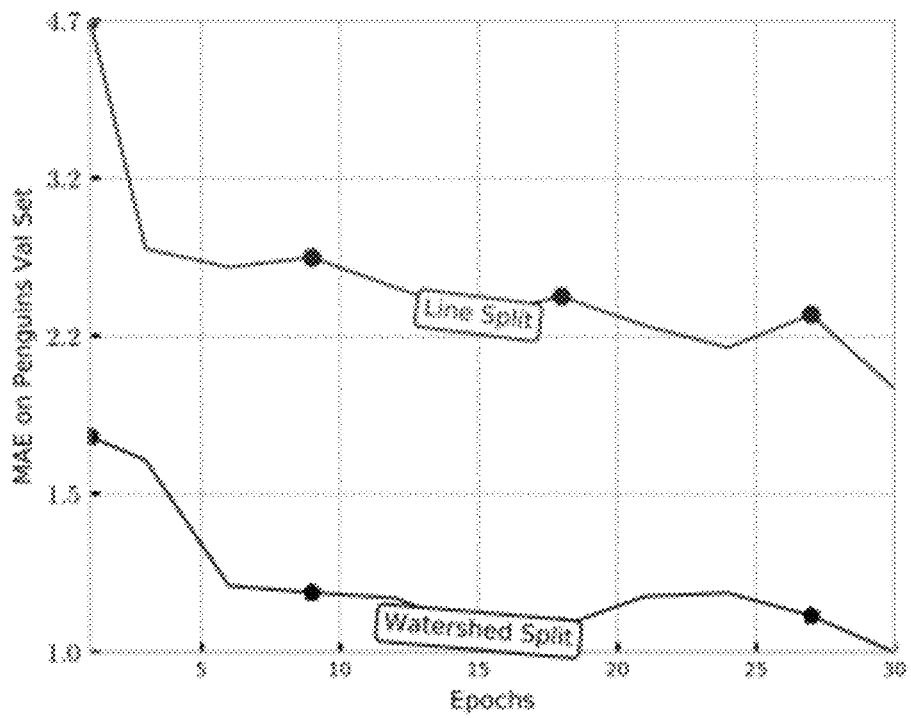
FIG. 3E is a chart showing the relative performance of the line split refinement and the watershed split refinement on the Penguins validation set.

FIGS. 3D and 3E show a comparison of these splitting methods over multiple epochs. FIG. 3D shows the line split process as compared to the watershed split method over 30 epochs on the Trancos validation set. FIG. 3E shows the line split process as compared to the watershed split method over 30 epochs on the Penguins validation set. Again, as can be seen, the watershed split performs better than the line split. Additionally, the watershed split achieves much faster improvement on each data set with respect to the number of epochs.

Note, however, that it is not necessary to get the 'right' edges to accurately count the objects in an image. It is only necessary to have 'edges' in between: that is, to have a positive region on each object and a negative region between objects. Other heuristics may be used to construct a negative region which could still be used with the present invention. For example, the fast label propagation methods proposed in Nutini, Laradji, and Schmidt ("Let's make block coordinate descent go fast: Fast greedy-rules, message-passing, active-set complexity, and superlinear convergence", arXiv: 1712.08859 [math.OC], 2017, the entirety of which is herein incorporated by reference) and in Nutini et al. ("Convergence rates for greedy kaczmarz algorithms, and faster randomized kaczmarz rules unsing the orthogonatlity graph", arXiv:1612.07838 [math.NA], the entirety of which is herein incorporated by reference) can be used to determine the boundaries between the objects in the training image.

False Positive Loss

The false positive loss term, $\mathcal{L}_F$, discourages the segmentation module from predicting an object blob with no point markers, in order to reduce the number of false positive predictions. This loss term is defined as $$\mathcal{L}_F(S, T) = -\sum_{i \in B_{fp}} \log(S_{ik}),  \quad (8)$$

where k=0 is the background class, and $B_{fp_c}$ is the set of pixels constituting the group blobs predicted for class c that contain no point markers.

Once the training process is complete, the neural network can process new input images, whether or not those new input images contain any annotation. Note that these loss functions are only used during training, to train the neural network. The framework does not split or remove false positive blobs at test time. The predictions with an input image 20 are based purely on the blobs obtained from the probability matrix S, computed by the trained neural network.

EXAMPLES

For clarity, the following examples of the present invention in testing scenarios use one specific implementation of the invention. Various tests were run using an FCN-based implementation of the invention. It should be understood that this implementation is not to be taken as limiting the invention in any way. As discussed above, various implementations other than those using an FCN-based segmentation module may be used, including rule-based modules and other neural network architectures and configurations.

The architecture of the FCN in the implementation used in testing was based on the FCN8 model proposed for semantic segmentation by Shelhamer. This model comprises a sequence of skip-connections and upsampling layers, and outputs a confidence score for each pixel in the input. Weights of the FCN were initialized with a network that was pre-trained to perform classification on the Imagenet dataset. However, as would be evident to the person skilled in the art, such an embodiment of the present invention can use any FCN architecture such as Deeplab, Tiramisu, or PSPnet.

The testing FCN was trained using the Adam optimizer (disclosed in Kingma and Ba, "Adam: A method for stochastic optimization", arXiv:1412.6980v9 [cs.LG], 2017, the entirety of which is herein incorporated by reference) with a learning rate of $10^{-5}$ and a weight decay of $5 \times 10^{-5}$. The tests were run on various publicly available datasets (referred to as Penguins, Trancos, Parking Lot, MIT Traffic, and PASCAL VOC 2007). For the smaller of these datasets (PKLot, Trancos, and MIT Traffic), the FCN was trained for 1000 epochs, with each epoch being a full pass through the data. For the larger datasets (PASCAL VOC 2007 and Penguins), the FCN was trained for 200 epochs, with each epoch being 3000 iterations. (As would be clear to the person skilled in the art of neural networks, each dataset of images to be counted would require a new network, trained specifically for that task.)

Each test dataset tested provides a validation set, which was used for early stopping. During training, the FCN used a batch size of 1, which can be an image of any size. At each iteration, a data augmentation process was performed. As a result of this process, there was a 50% chance that the FCN would horizontally flip the input image before applying the forward pass.

The results of the tests were evaluated against several well-known metrics. For datasets with objects of a single class (e.g., Penguins), the metric used was the mean absolute error (MAE), which measures the deviation of the predicted count $p_i$ from the true count $c_i$ as follows:

$$MAE = \frac{1}{N}\sum_i |p_i - c_i|.$$

For datasets with objects of multiple classes (such as PASCAL VOC 2007), the metric used was the mean root mean square error (mRMSE, described in detail in Blumensath and Davies, "Iterative hard thresholding for compressed sensing", Applied and Computational Harmonic Analysis 27(3), 2009, the entirety of which is herein incorporated by reference). Localization performance was measured using the grid average mean absolute error (GAME) proposed by Arjovsky, Chintala, and Bottou (in "Wasserstein Generative Adversarial Networks", Proceedings of the 34$^{th}$ International Conference on Machine Learning, 2017, the entirety of which is herein incorporated by reference). Additionally, an additional metric (an "F-Score") was introduced to assess the localization performance of the detected object blobs.

Example 1: Penguins Dataset

The Penguins dataset comprises images of penguin colonies located in Antarctica. The images are taken from fixed cameras that observe 40 regions for the purpose of monitoring penguin population change. The images have been annotated by 12 people who label each penguin with a single point. This annotation task is complicated as it is difficult to distinguish between overlapping penguins in the images. Therefore, the annotators make different counts of the penguins. Previous counting work with the Penguins dataset used all 12 annotations in the training phase in order to estimate the size and shape of the penguins (Arteta, Lempitsky, and Zisserman, "Counting in the Wild", European Conference on Computer Vision, 2016, the entirety of which is herein incorporated by reference). Since the present invention does not require knowledge about the size of the objects, the test was run using only a single annotation for each training image (for each image, the annotation with the greatest number of labeled penguins). Due to the large size of the Penguin dataset images, each was resized to 30% of its original size during training, validation, and testing.

The Penguins dataset was split as in Arteta, into a 'mixed' dataset split and a 'separated' dataset split. In the 'separated' dataset split, the images in the training set come from different cameras than those in the test set. In the 'mixed' dataset split, the images in the training set come from the same cameras as those in the test set. As in Arteta, the trained model is evaluated in two different settings: Max and Median. In the Max setting, the 'ground-truth count' (considered the true number of penguins) for an image is the maximum number of annotations made by an annotator. In the Median setting, the ground-truth count for an image is the medina number of annotations made by an annotator. In Table 2, below, the results of the present invention are compared to those of Arteta using the mean absolute error (MAE) metric defined above. As can be seen, the present invention outperformed the Arteta methods in each setting explained here. Note that the Arteta counting methods used depth information and the results of all 12 annotators. In contrast, again, the present invention used only the point-level annotations (i.e., point markers) made by a single annotator, without considering depth information.

TABLE 2

Penguins dataset. Results of the counting approach in Arteta and the Glance method of Chattopahyay against the results of the present invention, comparing the mean absolute error (MAE). Smaller values indicate better performance.

| Method | Separated | | Mixed | |
|---|---|---|---|---|
| | Max | Median | Max | Median |
| Density-only Arteta | 8.11 | 5.01 | 9.81 | 7.09 |
| With seg and depth Arteta | 6.38 | 3.99 | 5.74 | 3.42 |
| With seg and no depth Arteta | 5.77 | 3.41 | 5.35 | 3.26 |
| Glance | 6.08 | 5.49 | 1.84 | 2.14 |
| LC-FCN8$_{Present\ Invention}$ | 3.74 | 3.28 | 1.62 | 1.80 |
| LC-ResFCN$_{Present\ Invention}$ | 3.96 | 3.43 | 1.50 | 1.69 |

Example 2: Trancos Dataset

The Trancos dataset comprises images taken from traffic surveillance cameras located along different roads. The task for this dataset was to count the vehicles present in the regions of interest of the traffic scenes. Each vehicle is labeled with a single point marker that represents its location. Multiple previous efforts have been made to count the vehicles in the Trancos dataset, including among others by:
  Guerrero-Gómez-Olmedo et al, "Extremely Overlapping Vehicle Counting", Iberian Conference on Pattern Recognition and Image Analysis, 2015;
  Oñoro-Rubio and López-Sastre, "Towards perspective-free object counting with deep learning", ECCV 2016;
  Oquab et al, "Is object localization for free? Weakly-supervised learning with convolutional neural networks", Proceedings of the IEEE Conference on Computer Vision and Pattern Recognition, 2015;
  Zhang et al, "Understanding traffic density from large-scale web camera data", CVPR 2017;
  Zhang et al, "FCN-rlstm: Deep spatio-temporal neural networks for vehicle counting in city cameras", ICCV 2017; and
  Li, Zhang, and Chen, "CSRNET: Dilated convolutional neural networks for understanding the highly congested scences", CVPR 2018.

All of the above references are herein incorporated by reference in their entirety. The training, validation, and testing sets used in these tests were provided in Guerrero-Gómez-Olmedo, above.

TABLE 3

Trancos dataset. Results of previous state-of-the-art methods against the results of the present invention, comparing the mean absolute error (MAE) and the grid average mean absolute error (GAME). Smaller values indicate better performance.

| Method | MAE | GAME(1) | GAME(2) | GAME(3) |
|---|---|---|---|---|
| Lemptisky + SIFT | 13.76 | 16.72 | 20.72 | 24.36 |
| Hydra CCNN | 10.99 | 13.75 | 16.69 | 19.32 |
| FCN-MT | 5.31 | — | — | — |
| FCN-HA | 4.21 | — | — | — |
| CSRNet | 3.56 | 5.49 | 8.57 | 15.04 |
| Glance | 7.0 | — | — | — |
| LC-FCN8$_{Present\ Invention}$ | 4.53 | 7.00 | 10.66 | 16.05 |
| LC-ResFCN$_{Present\ Invention}$ | 3.32 | 5.2 | 7.92 | 12.57 |
| LC-PSPNET$_{Present\ Invention}$ | 3.57 | 4.98 | 7.42 | 11.67 |

Table 3, above, compares the results of the present invention with the previous state-of-the-art. The present invention achieves better than state-of-the-art results for both MAE and GAME metrics. The GAME metric evaluates the localization performance of density-based counting methods. GAME(L) subdivides the image using a grid of 4 L non-overlapping regions. The error is computed as the sum of the mean absolute errors in each of these subregions. Using the present invention, the predicted count is the number of predicted object blob centers in each subregion.

The Trancos dataset shows many vehicles of different sizes, ranging from small cars to large buses. Methods such as those in Oquab require the generation of a so-called 'perspective map' when counting objects of different sizes. Different methods, such as those in Oñoro-Rubio, use a 'multi-scale approach' to learn to count different-sized objects. The present invention, however, can detect different sized objects automatically, and thus does not require a perspective map, or a specifically engineered multi-scale approach.

Example 3: Pascal VOC 2007

This dataset contains images taken from everyday scenes. Objects in the images come from 20 different classes. The objects vary widely in shape and size across the images and are located in scenes with challenging backgrounds. The present invention uses the training, validation, and test split as specified in Chattopadhyay (cited above), in order to compare with their state-of-the-art results. While the original annotations consist of bounding boxes and a segmentation mask, Bearman (also cited above) labeled the dataset with point-level annotations. The present invention thus uses Bearman's point-level annotations as point markers to train the FCN.

Since the PASCAL VOC 2007 dataset is used for multi-class object counting, the evaluation metric used was the mean root mean square error (mRMSE) and its variations proposed by Chattopadhyay. Among these variations, mRMSE-nz and m-relRMSE-nz more clearly reflect the accuracy of the counts produced for objects that exist in the images. Additionally, m-relRMSE and m-relRMSE-nz provide a count metric that is less biased towards classes that have more objects than others. Again, Chattopadhyay, fully incorporated herein, contains more details about each of these metrics.

In Table 4, below, the results of the present invention are compared against those presented in Chattopadhyay, which used Glance, Aso-sub, and Ensemble methods. The Glance method, as mentioned above, uses image-level annotation, whereas Aso-sub and Ensemble use full per-pixel annotation. The present invention outperforms all three methods using only point-level annotation.

TABLE 4

PASCAL VOC 2007 dataset. Results of the counting approaches in Chattopadhyay et al against the results of the present invention, comparing the mean root mean square error (mRMSE) and its variations. Smaller values indicate better performance.

| Method | mRMSE | mRMSE-nz | m-relRMSE | m-relRMSE-nz |
|---|---|---|---|---|
| Glance-noft-2L | 0.50 | 1.83 | 0.27 | 0.73 |
| Aso-sub-ft-3 × 3 | 0.42 | 1.65 | 0.21 | 0.68 |
| Faster-RCNN | 0.50 | 1.92 | 0.26 | 0.85 |
| LC-ResFCN$_{Present\ Invention}$ | 0.31 | 1.20 | 0.17 | 0.61 |
| LC-PSPNet$_{Present\ Invention}$ | 0.35 | 1.32 | 0.20 | 0.70 |

Example 4: Crowd Datasets

Table 5, below, reports the MAE score of the present invention for three different crowd datasets using a setup described in the survey paper by Sindagi and Patel ("A survey of recent advances in CNN-based single image crowd counting and density estimation", Pattern Recognition Letters, 2017, the entirety of which is herein incorporated by reference). For this experiment, the present invention used a neural network with a ResFCN architecture and applied the watershed splitting method. As can be seen, the present invention achieves competitive performance for crowd counting, bettering the state-of-the-art in multiple cases.

Figure 4:
FIG. 4 is an image showing experimental results of the present invention on one test image.

Additionally, FIG. 4 shows the predicted blobs of the present invention on a test image taken from the Shanghai-Tech B dataset. We see that our model predicts a blob on the face of each individual. This is expected as, in that dataset, point markers are placed on each person's face.

TABLE 5

Crowd datasets. MAE results. Smaller values indicate better performance.

| Methods | UCSD | Mall | ShanghaiTech B |
|---|---|---|---|
| FCN-rLSTM | 1.54 | — | — |
| MoCNN | — | 2.75 | — |
| CNN-boosting | 1.10 | 2.01 | — |
| M-CNN | 1.07 | — | 26.4 |
| CP-CNN | — | — | 20.1 |
| CSRNet | 1.16 | — | 10.6 |
| LC-FCN8$_{Present\ Invention}$ | 1.51 | 2.42 | 13.14 |
| LC-ResFCN$_{Present\ Invention}$ | 0.99 | 2.12 | 25.89 |
| LC-PSPNet$_{Present\ Invention}$ | 1.01 | 2.00 | 21.61 |

Example 5: Parking Lot

The Parking Lot (or PKLot) dataset is provided by Almeida et al, in connection with "PKLot—A Robust Dataset for Parking Lot Classification", Expert Systems with Applications 42(11), 2015, the entirety of which is herein incorporated by reference. The dataset comprises surveillance images taken at a parking lot in Curitiba, Brazil. The task for this dataset is to determine the number and location of each of the cars in the parking spots. The images were acquired under different weather conditions: rainy, overcast, and sunny. Since Almeida does not provide a clear description of the training, validation and test sets used therein, the present invention was tested using the first 50% of the images as the training/validation set and the remaining 50% as the test set. The training set, further, was set to be 80% of the training/validation set, and the remaining 20% was set as the validation set. The images in this dataset contain bounding boxes to indicate each car. For use with the present invention, the bounding boxes were converted into point-level annotations by taking the center of each bounding box as a point marker.

The PKLot dataset was never previously used to test counting methods. Therefore, the present invention was tested against the results of the Glance method (discussed above and disclosed in Chattopadhyay). The present invention outperformed the Glance method, as can be seen from Table 6 below.

Example 6: MIT Traffic

This dataset comprises surveillance videos for a single location taken from a static camera. The task was to localize and count the pedestrians in each frame of the videos. The dataset has 20 videos, which are split into a training set (Videos 1 to 8), a validation set (Videos 9 to 10), and a test set (Videos 11 to 20). Each video frame is provided with a bounding box indicating each pedestrian. For use with the present invention, the centre of each bounding box was converted to a point marker.

As with the PKLot dataset, the MIT Traffic dataset has never been used to test counting methods before. Thus, the results of the present invention were evaluated against those of the Glance method. Table 6, below, shows that the present invention again outperforms Glance.

Localization Benchmark and Loss Function Analysis

As mentioned above, an F-score-based metric was developed to compare the localization performance between the present invention and several baselines. Various tests were then run showing the relative performance of the present invention and the Glance method as described above, with regard to this F-Score metric and the mean average error (MAE). The results of these tests are also shown in Table 6, below.

Localization Benchmark

The F-score-based metric was developed to evaluate the localization performance of the present invention, more precisely than the well-known GAME metric. This F-score-based metric is adapted from metrics used in counting by detection, and is designed for the present invention's use of blobs and point markers. Simply, a blob is determined to be 'correct' if that blob contains a point marker. F-score is known to be a reliable measure for detection-based algorithms and accounts for both precision and recall. Additionally, as the resulting scores are between 0 and 1, it is relatively easy to compare F-scores across different methods.

The F-score metric used to evaluate the present invention, then, can be described as follows. Let $N_p$ be the number of point markers in a given image. The F-score (FS) is computed by first counting the number of unique group blobs that contain at least one point marker. These are the true positives (TP). Next, the number of group blobs containing no point markers is determined. These are the false positives (FP). The number of false negatives (FN) is then $N_p$−TP. Note that, for each class, as the predicted blobs cannot intersect, no point marker can be inside more than one blob. As a result, $$F\text{-Score} = \frac{2TP}{2TP + FP + FN} \quad (7)$$

Loss Function Analysis

Figure 5:
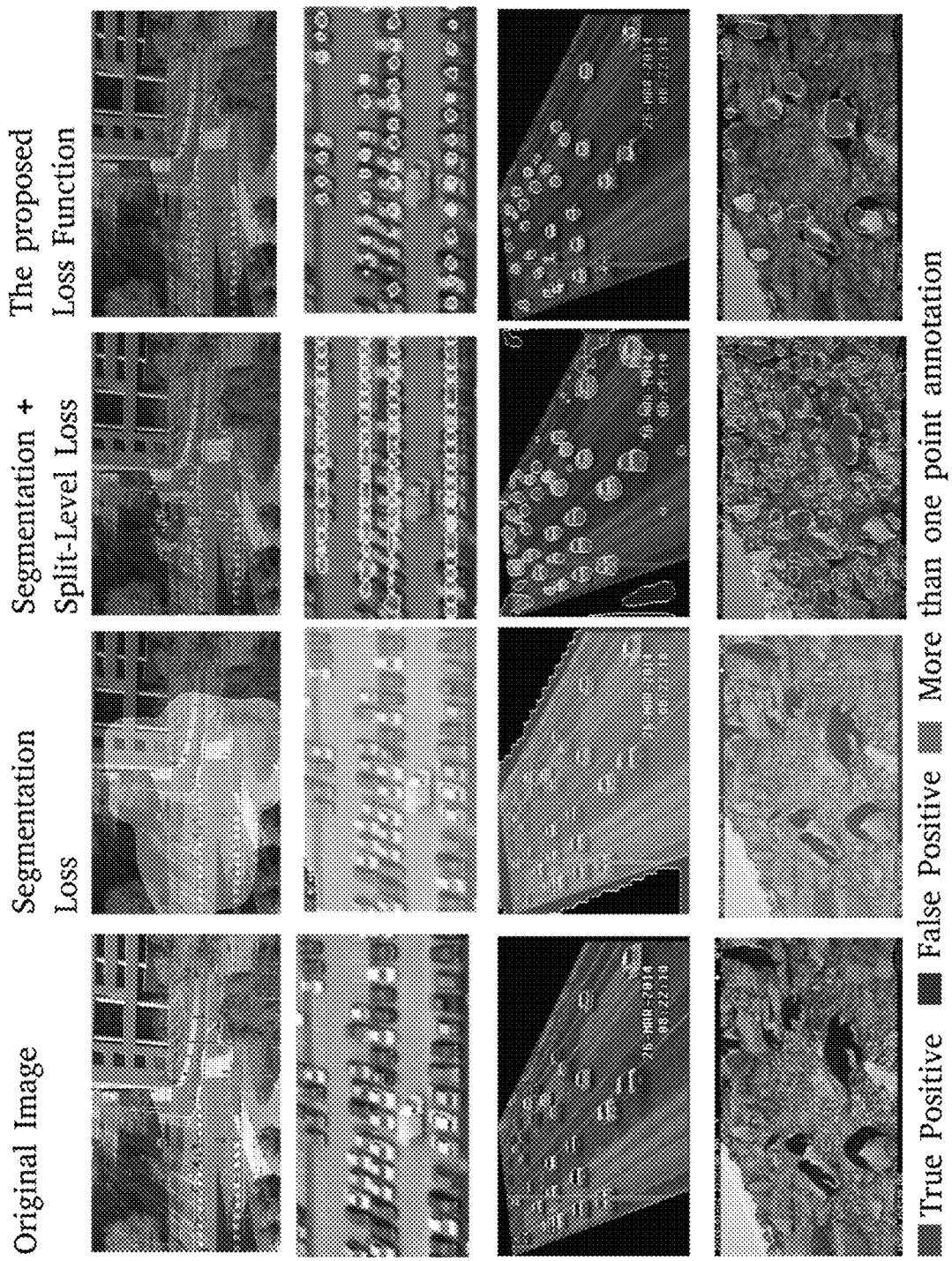
FIG. 5 is an image showing experimental results of tests of a system according to the present invention.

The effect of each component of the loss function on the test results was evaluated. To begin, the loss function was divided into two main components: i. the "segmentation loss" ($\mathcal{L}_I+\mathcal{L}_p$ in equation (1) above); and ii. the "instance-level loss" ($\mathcal{L}_s+\mathcal{L}_F$ in equation (1)). Referring now to FIG. 5, the right-most column shows that using all the loss terms together provides the best performance. As can be seen, the green blobs and red blobs refer to the true positive and false positive predictions, respectively. The yellow blobs refer to blobs that encapsulate more than one object (i.e., group blobs containing more than one point marker).

The second column from the left in FIG. 5 is the result of using only the segmentation loss. Since this part of the loss function only requires predicting point markers and at least one pixel for the classes that are present, the most likely solution is to label one large blob that groups many objects together. Thus, with only segmentation loss used, a large blob is likely to be the only output. The efficiency of the segmentation loss can be improved in dataset with many different background images (e.g., PASCAL VOC 2007), as the image-level loss term allows the segmentation module to learn pixel regions that should not belong to the objects of interest.

Using the segmentation loss and the split-level loss terms leads to many false positives, shown as the red blobs in the third column of FIG. 5. This is because the only constraint provided by the split-level loss is that blobs should not contain more than one point marker. Therefore, the segmentation module can freely learn to predict background regions that are similar to the objects of interest. As a result, adding the false positive loss term refines the segmentation module's predictions and encourages the segmentation module to predict only the true-positive objects as shown in the last column of FIG. 5.

Table 6 shows the performance of the Glance method, the segmentation loss, the segmentation loss with the split-level loss term, and the full loss function as in equation (1) above for object counting (the MAE metric) and localization performance (the F-Score metric). Note that an implementation of the present invention outperforms every other method in every tested case.

TABLE 6

Comparison of Glance method and various parts of the loss function of the present invention. The LC-ResFCN and LC-FCN8 rows report results for different architectures of the present invention. For the MAE metric, smaller values indicate better performance. For the FS (F-Score) metric, larger values indicate better performance.

| Method | MIT Traffic | | PKLot | | Trancos | | Penguins Separated | |
| --- | --- | --- | --- | --- | --- | --- | --- | --- |
| | MAE | FS | MAE | FS | MAE | FS | MAE | FS |
| Glance | 1.57 | — | 1.92 | — | 7.01 | — | 6.09 | — |
| $\mathcal{L}_I+\mathcal{L}_{iP}$ | 3.11 | 0.38 | 39.62 | 0.04 | 38.56 | 0.05 | 9.81 | 0.08 |
| $\mathcal{L}_I+\mathcal{L}_{iP}+\mathcal{L}_{iS}$ | 1.62 | 0.76 | 9.06 | 0.83 | 6.76 | 0.56 | 4.92 | 0.53 |
| $\mathcal{L}_I+\mathcal{L}_{iP}+\mathcal{L}_F$ | 1.84 | 0.69 | 39.60 | 0.04 | 38.26 | 0.05 | 7.28 | 0.04 |
| LC-ResFCN | 1.26 | 0.81 | 10.16 | 0.84 | 3.32 | 0.68 | 3.96 | 0.63 |
| LC-FCN8 | 0.91 | 0.69 | 0.21 | 0.99 | 4.53 | 0.54 | 3.74 | 0.61 |

Figure 6:
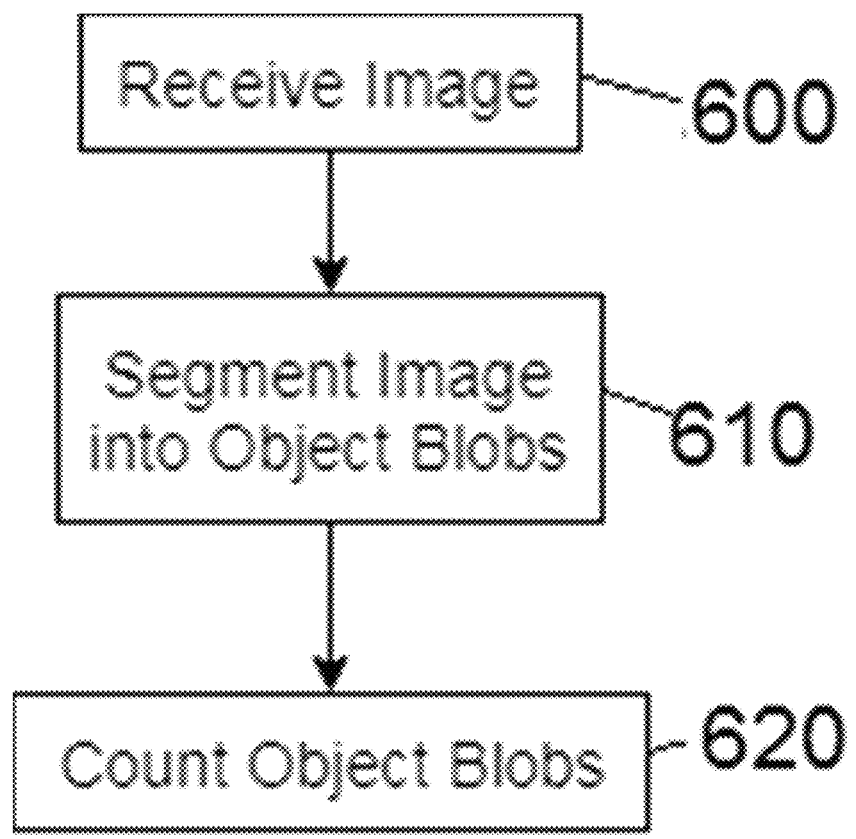
FIG. 6 is a flowchart detailing a method according to an aspect of the present invention.

FIG. 6 is a flowchart detailing a method according to one aspect of the invention. At step 600, an input image is received. As discussed above, this input image contains at least one point marker, which may be a single marked pixel or a marked group of pixels. Each point marker indicates an approximate location of an object of interest in the image. At step 610, the image is segmented into object blobs. As discussed above, there are many possible implementations of this segmentation step, including those using rule-based components and those using neural networks of various forms. Once the segmentation into object blobs is complete, a count of those object blobs can be performed at step 620.

Figure 7:
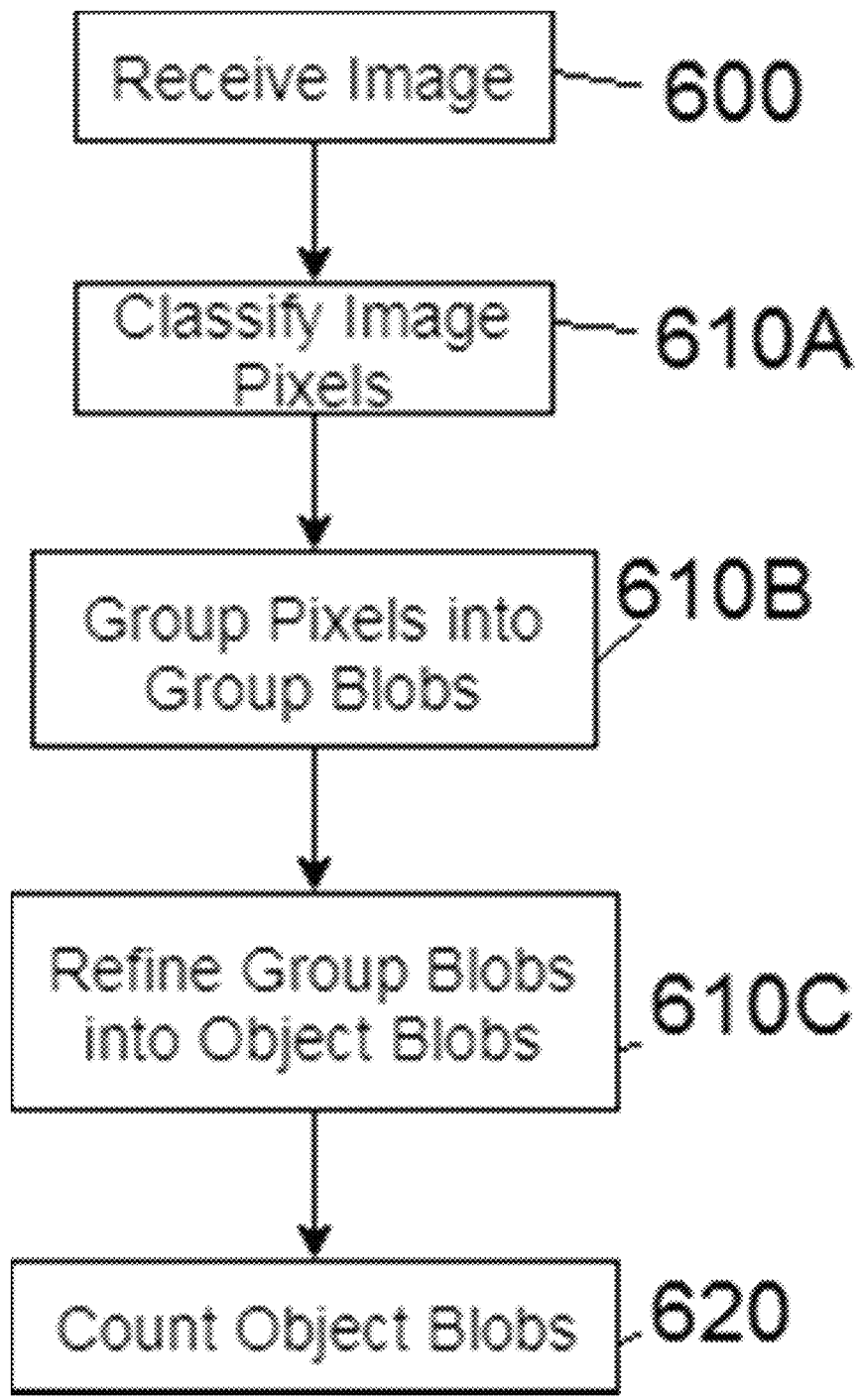
FIG. 7 is another flowchart detailing another embodiment of the method of FIG. 4.

FIG. 7 is a flowchart detailing another embodiment of the method shown in FIG. 5. As in FIG. 6, an input image containing at least one point marker is received at step 600. However, the segmentation step in FIG. 7 comprises three separate substeps. First, at step 610A, each pixel in the image is classified into a class based on a type of object depicted by that pixel. Then, at step 610B, pixels of the same class are grouped together into group blobs, so that each pixel added to a specific group is adjacent to at least one other pixel in that specific group. Next, at step 610C, the group blobs are refined into object blobs corresponding to individual objects. Lastly, as in FIG. 6, the object blobs are counted at step 620. Again, depending on the implementation, these steps may be performed as part of a training process for a neural network.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for counting objects in an image, said method comprising the steps of:
   (a) receiving said image;
   (b) segmenting said image into at least one object blob, each object blob being an indication of a single object; and
   (c) counting said at least one object blob to thereby result in a count of said number of objects;
   wherein said segmenting in step (b) is performed using a neural network and wherein said neural network has been trained to perform said segmenting according to the following steps:
      receiving a set of training images, each of said training images comprising training pixels, at least one of said training images containing at least one training object and at least one point marker, each one of said training objects being associated with a single point marker;
      classifying each training pixel of each training image in said set into a class based on a type of training object depicted by said training pixel, to thereby produce classified training pixels;
      grouping similarly classified training pixels into at least one group blob, wherein each group blob is a group of pixels, such that all of said pixels in said group of pixel belong to a same class, and wherein said same class corresponds to a desired type of training object to be counted, and wherein each specific pixel in said group of pixels is adjacent to at least one other pixel in said group of pixels, and wherein each group blob contains at least one point marker; and
      refining said at least one group blob into at least one training object blob, such that said at least one training object blob contains a single point marker, said at least one training object blob thereby being an indication of a single specific training object;
   and wherein said refining includes applying at least one process that is based on a brightness of said training pixels to thereby split said at least one group blob into said at least one training object blob.

2. The method according to claim 1, wherein step (b) further comprises the steps of:
   (b.1) classifying each pixel of said image into a class based on a type of object depicted by said pixel; and
   (b.2) grouping similarly classified pixels resulting from step (b.1) into said at least one object blob.

3. The method according to claim 1, wherein said at least one point marker is a marked pixel in each training image in said set.

4. The method according to claim 1, wherein said at least one point marker is a marked group of pixels in each training image in said set.

5. A system for counting objects in an image, said system comprising:
   a segmentation module for:
      receiving said image; and
      segmenting said image into at least one object blob, each object blob being an indication of a single object; and
   a counting module for counting said at least one object blob to thereby result in a count of said number of objects;

wherein said segmentation module comprises a neural network and wherein said neural network is trained to segment said image, said training occurring according to the following steps:

receiving a set of training images, each of said training images comprising training pixels, at least one of said training images containing at least one training object and at least one point marker, each one of said training objects being associated with a single point marker;

classifying each training pixel of each training image in said set into a class based on a type of object depicted by said training pixel, to thereby produce classified training pixels;

grouping similarly classified training pixels into at least one group blob, wherein each group blob is a group of pixels, such that all of said pixels in said group of pixel belong to a same class, and wherein said same class corresponds to a desired type of training object to be counted, and wherein each specific pixel in said group of pixels is adjacent to at least one other pixel in said group of pixels and wherein each group blob contains at least one point marker; and refining said at least one group blob into said at least one training object blob, such that said at least one training object blob contains a single point marker, said at least one training object blob thereby being an indication of a single specific training object;

and wherein said refining includes applying at least one process that is based on a brightness of said training pixels to thereby split said at least one group blob into said at least one training object blob.

6. The system according to claim 5, wherein said segmentation module further comprises:

a classifying module for classifying each pixel of said image into a class based on a type of object depicted by said pixel; and a grouping module for grouping similarly classified pixels produced by said classifying module into said at least one object blob.

7. The system according to claim 5, wherein said at least one point marker is a marked pixel in each training image in said set.

8. The system according to claim 5, wherein said at least one point marker is a marked group of pixels in each training image in said set.

9. Non-transitory computer-readable media having encoded thereon computer-readable and computer-executable instructions that, when implemented, execute a method for counting objects in an image, said method comprising the steps of:

(a) receiving said image;

(b) segmenting said image into at least one object blob, each object blob being an indication of a single object; and (c) counting said at least one object blob to thereby result in a count of said number of objects;

wherein said segmenting in step (b) is performed using a neural network and wherein said neural network has been trained to perform said segmenting according to the following steps:

receiving a set of training images, each of said training images comprising training pixels, at least one of said training images containing at least one training object and at least one point marker, each one of said training objects being associated with a single point marker;

classifying each training pixel of each training image in said set into a class based on a type of training object depicted by said training pixel, to thereby produce classified training pixels;

grouping similarly classified training pixels into at least one group blob, wherein each group blob is a group of pixels, such that all of said pixels in said group of pixel belong to a same class, and wherein said same class corresponds to a desired type of training object to be counted, and wherein each specific pixel in said group of pixels is adjacent to at least one other pixel in said group of pixels, and wherein each group blob contains at least one point marker; and refining said at least one group blob into at least one training object blob, such that said at least one training object blob contains a single point marker, said at least one training object blob thereby being an indication of a single specific training object;

and wherein said refining includes applying at least one process that is based on a brightness of said training pixels to thereby split said at least one group blob into said at least one training object blob.

10. The non-transitory computer-readable media according to claim 9, wherein step (b) further comprises the steps of:

(b.1) classifying each pixel of said image into a class based on a type of object depicted by said pixel; and (b.2) grouping similarly classified pixels resulting from step (b.1) into said at least one object blob.

11. The non-transitory computer-readable media according to claim 9, wherein said at least one point marker is a marked pixel in each training image in said set.

12. The non-transitory computer-readable media according to claim 9, wherein said at least one point marker is a marked group of pixels in each training image in said set.

\* \* \* \* \*